United States Patent
Hara et al.

(10) Patent No.: US 10,086,900 B2
(45) Date of Patent: Oct. 2, 2018

(54) SADDLE RIDING TYPE VEHICLE

(71) Applicant: YAMAHA HATSUDOKI KABUSHIKI KAISHA, Iwata-shi, Shizuoka (JP)

(72) Inventors: Nobuo Hara, Shizuoka (JP); Yu Shibuya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/128,456

(22) PCT Filed: Mar. 16, 2015

(86) PCT No.: PCT/JP2015/057731
§ 371 (c)(1),
(2) Date: Sep. 23, 2016

(87) PCT Pub. No.: WO2015/146679
PCT Pub. Date: Oct. 1, 2015

(65) Prior Publication Data
US 2017/0106935 A1 Apr. 20, 2017

(30) Foreign Application Priority Data
Mar. 24, 2014 (JP) .................................. 2014-060197

(51) Int. Cl.
*B62K 5/05* (2013.01)
*B62K 5/10* (2013.01)
(Continued)

(52) U.S. Cl.
CPC .............. *B62K 25/04* (2013.01); *B62K 5/027* (2013.01); *B62K 5/05* (2013.01); *B62K 5/08* (2013.01);
(Continued)

(58) Field of Classification Search
CPC . B62D 5/027; B62D 5/05; B62D 5/08; B62D 5/10; B62D 25/04; B62K 5/027;
(Continued)

(56) References Cited

U.S. PATENT DOCUMENTS 4,719,984 A * 1/1988 Watanabe ............... B60T 1/062
180/215
4,781,258 A * 11/1988 Tamura .................. B60K 11/06
180/229
(Continued)

FOREIGN PATENT DOCUMENTS

EP  2 154 050 A1  2/2010
EP  2 514 660 A1  10/2012
(Continued)

OTHER PUBLICATIONS

Official Communication issued in International Patent Application No. PCT/JP2015/057731, dated Jun. 16, 2015.

*Primary Examiner* — Barry Gooden, Jr.
(74) *Attorney, Agent, or Firm* — Keating and Bennett, LLP (57) ABSTRACT

A saddle riding type vehicle that ensures little or no difference between an actual state of the vehicle and a state of the vehicle recognized by the rider includes a vehicle body frame, a pair of front wheels, a linkage, a lock, a controller, and a notifier. The linkage connects the pair of front wheels to the vehicle body frame. The lock locks the linkage by preventing operation of the linkage and unlocks the linkage by allowing the linkage to operate. The controller controls locking and unlocking of the linkage by the lock. The notifier notifies that the linkage is locked when relative displacement between the pair of front wheels in the vertical direction exceeds a prescribed range.

7 Claims, 7 Drawing Sheets

(51) Int. Cl.
*B62K 5/08* (2006.01)
*B62K 5/027* (2013.01)
*B62K 25/04* (2006.01)
*B62K 5/00* (2013.01)

(52) U.S. Cl.
CPC .......... *B62K 5/10* (2013.01); *B62K 2005/001* (2013.01); *B62K 2025/044* (2013.01); *B62K 2025/047* (2013.01)

(58) Field of Classification Search
CPC ... B62K 5/05; B62K 5/08; B62K 5/10; B62K 25/04
See application file for complete search history.

(56) References Cited

U.S. PATENT DOCUMENTS

| | | | | |
|---|---|---|---|---|
| 4,787,470 A * | 11/1988 | Badsey | ................ | B62D 61/065 180/210 |
| 4,826,057 A * | 5/1989 | Yamada | ................ | B62K 5/027 180/215 |
| 5,094,315 A * | 3/1992 | Taki | ................ | B62K 19/46 180/219 |
| 6,763,905 B2 * | 7/2004 | Cocco | ................ | B60G 21/007 180/210 |
| D547,242 S * | 7/2007 | Lambri | ................ | B62K 5/08 D12/110 |
| 7,243,765 B2 * | 7/2007 | Marcacci | ................ | B60G 15/063 188/300 |
| 7,264,251 B2 * | 9/2007 | Marcacci | ................ | B60G 17/0152 280/124.103 |
| D598,328 S * | 8/2009 | Lambri | ................ | B62K 5/05 D12/110 |
| 7,648,148 B1 * | 1/2010 | Mercier | ................ | B60G 21/007 180/210 |
| 8,991,542 B2 * | 3/2015 | Yu | ................ | B62K 5/027 180/209 |
| 9,487,234 B1 * | 11/2016 | Matthies | ................ | B62D 9/02 |
| 2002/0007977 A1 * | 1/2002 | Ishii | ................ | B62J 17/00 180/219 |
| 2002/0190494 A1 * | 12/2002 | Cocco | ................ | B60G 21/007 280/124.135 |
| 2004/0227321 A1 * | 11/2004 | Kuroki | ................ | B60G 3/02 280/124.135 |
| 2005/0012291 A1 * | 1/2005 | Bagnoli | ................ | B62K 5/05 280/124.103 |
| 2005/0167174 A1 | 8/2005 | Marcacci | | |
| 2005/0167217 A1 * | 8/2005 | Marcacci | ................ | B60G 15/063 188/300 |
| 2006/0065456 A1 * | 3/2006 | Noda | ................ | B62K 11/04 180/219 |
| 2007/0075517 A1 * | 4/2007 | Suhre | ................ | B60G 3/20 280/124.134 |
| 2007/0199761 A1 * | 8/2007 | Seki | ................ | B62K 5/027 180/312 |
| 2007/0262548 A1 * | 11/2007 | Rawlinson | ................ | B60G 21/007 280/124.103 |
| 2009/0107754 A1 * | 4/2009 | Doperalski | ................ | B62K 5/027 180/337 |
| 2009/0299565 A1 * | 12/2009 | Hara | ................ | B60G 3/14 701/31.4 |
| 2010/0025944 A1 * | 2/2010 | Hara | ................ | B62D 9/02 280/5.509 |
| 2010/0044977 A1 * | 2/2010 | Hughes | ................ | B60G 21/007 280/5.509 |
| 2010/0147615 A1 * | 6/2010 | Tsujii | ................ | B60G 3/145 180/215 |
| 2012/0181783 A1 * | 7/2012 | Nakano | ................ | B62K 11/10 280/834 |
| 2013/0168944 A1 * | 7/2013 | Bartolozzi | ................ | B60G 3/01 280/269 |
| 2013/0247881 A1 * | 9/2013 | Okubo | ................ | F02M 25/06 123/519 |
| 2013/0248273 A1 * | 9/2013 | Nakamura | ................ | F28D 1/00 180/229 |
| 2014/0204598 A1 * | 7/2014 | Di Tanna | ................ | B60Q 1/12 362/460 |
| 2015/0158540 A1 * | 6/2015 | Hara | ................ | B62K 11/10 180/219 |
| 2015/0166139 A1 * | 6/2015 | Inomori | ................ | B62K 11/04 180/219 |
| 2016/0056482 A1 * | 2/2016 | Otsuka | ................ | B60L 11/1898 180/220 |
| 2016/0090141 A1 * | 3/2016 | Mizukura | ................ | B62J 35/00 180/219 |
| 2016/0107713 A1 * | 4/2016 | Takano | ................ | B62K 5/027 180/210 |
| 2016/0114850 A1 * | 4/2016 | Takano | ................ | B62K 11/04 180/210 |
| 2016/0280305 A1 * | 9/2016 | Takada | ................ | B62K 11/10 |
| 2017/0101150 A1 * | 4/2017 | Shibuya | ................ | B62J 99/00 |
| 2017/0106930 A1 * | 4/2017 | Hara | ................ | B62K 5/027 |
| 2017/0106936 A1 * | 4/2017 | Shibuya | ................ | B62K 5/027 |

FOREIGN PATENT DOCUMENTS

| | | |
|---|---|---|
| FR | 2 953 184 A1 | 6/2011 |
| JP | 2005-313876 A | 11/2005 |
| JP | 2006-341837 A | 12/2006 |
| JP | 2011-045184 A | 3/2011 |
| JP | 2012-081784 A | 4/2012 |
| JP | 2012-126262 A | 7/2012 |
| JP | 2013-022993 A | 2/2013 |
| JP | 2013-244763 A | 12/2013 |

* cited by examiner

SADDLE RIDING TYPE VEHICLE

BACKGROUND OF THE INVENTION

1. Field of the Invention

The present invention relates to saddle riding type vehicles and more particularly to a saddle riding type vehicle including a pair of front wheels.

2. Description of the Related Art

An example of a saddle riding type vehicle is a three-wheeled vehicle including a pair of front wheels and a linkage that connects the pair of front wheels to a vehicle body frame. The three-wheeled vehicle is able to turn while leaning by the operation of the linkage.

JP 2005-313876 A discloses an anti-roll device for a three-wheeled vehicle. The anti-roll device includes a brake disk provided integrally with one element of the linkage and a caliper attached to a vehicle body frame. In the anti-roll device, the caliper is used to fix the brake disk to the vehicle body frame. In this way, the operation of the linkage is restricted. This prevents a rolling motion of the vehicle.

The operability of the vehicle greatly differs depending on whether the operation of the linkage is restricted or not. Therefore, the rider often drives the vehicle while being aware of whether the operation of the linkage is restricted. However, it has been discovered that recognizing whether the operation of the linkage is restricted is not sufficient in some cases. More specifically, an actual state of the vehicle and a state of the vehicle understood by the rider are more likely to differ depending on the state of the road surface when the operation of the linkage is prevented.

SUMMARY OF THE INVENTION

Preferred embodiments of the present invention significantly reduce or prevent a difference between the state of the vehicle and a state of the vehicle recognized by the rider when the operation of the linkage is prevented.

A saddle riding type vehicle according to a preferred embodiment of the present invention includes a vehicle body frame, a pair of front wheels, a linkage, a lock, a controller, a state determiner, and a notifier. The linkage connects the pair of front wheels to the vehicle body frame. The lock locks the linkage by preventing operation of the linkage and unlocks the linkage by allowing the linkage to operate. The controller controls locking and unlocking of the linkage via the lock. The state determiner determines whether relative displacement between the pair of front wheels in a vertical direction exceeds a prescribed range. The notifier notifies the rider that the linkage is locked when the relative displacement between the pair of front wheels in the vertical direction exceeds the prescribed range.

The vehicle is often upright when the linkage is locked. In this case, the rider may sometimes feel as if the pair of front wheels are in the same position in a direction of gravity. However, the front wheels may be locked when they are relatively displaced in the direction of gravity because of a sloped road surface or steps. In this case, if the vehicle is moved to a location on a flat road surface, the vehicle may be tilted.

According to a preferred embodiment of the present invention, the rider is notified that the linkage is locked when the pair of front wheels are shifted in the vertical direction. Therefore, an actual state of the vehicle and a state of the vehicle recognized by the rider are the same or substantially the same.

According to a preferred embodiment of the present invention, the notifier continuously notifies a locked state of the linkage. In this way, the rider is more easily aware of the locked state of the linkage.

According to a preferred embodiment of the present invention, the saddle riding type vehicle further includes an operator. The operator outputs an operation signal to the controller in response to an operation input by the rider. The controller controls the lock to unlock the linkage if the operation signal is input. The notifier notifies the rider that the linkage is locked until the linkage is unlocked if the relative displacement between the pair of front wheels in the vertical direction exceeds the prescribed range while the lock locks the linkage.

Accordingly, it is notified to the rider that the linkage is locked until the linkage is unlocked. Therefore, the rider is easily aware of the state in which the linkage is locked when the pair of front wheels are relatively displaced in the gravity direction.

According to a preferred embodiment of the present invention, the saddle riding type vehicle further includes an engine and an engine controller that controls the engine. The engine controller includes a limiter. The limiter limits the engine speed of the engine if the lock locks the linkage and the relative displacement between the pair of front wheels in the vertical direction exceeds the prescribed range.

Accordingly, when the linkage is locked and the pair of front wheels are relatively displaced in the gravity direction, traveling of the vehicle is prevented. Therefore, traveling of the vehicle is prevented when the pair of front wheels are relatively displaced in the gravity direction.

According to a preferred embodiment of the present invention, the pair of front wheels include a first front wheel and a second front wheel. The second front wheel is spaced apart from the first front wheel in a vehicle-widthwise direction. The saddle riding type vehicle further includes a displacement calculator. The displacement calculator calculates displacement of the second front wheel relative to the first front wheel in the vertical direction of the vehicle. The state determiner determines whether the relative displacement between the pair of front wheels in the vertical direction of the vehicle exceeds a prescribed range based on a calculation result from the displacement calculator.

According to a preferred embodiment of the present invention, the saddle riding type vehicle further includes a first arm, a second arm, a first displacement detector, and a second displacement detector. The first arm is connected to the first front wheel in a vertically displaceable manner. The second arm is connected to the second front wheel in a vertically displaceable manner. The first displacement detector detects displacement of the first arm in the vertical direction of the vehicle. The second displacement detector detects displacement of the second arm in the vertical direction of the vehicle. The displacement calculator calculates displacement of the second front wheel relative to the first front wheel in the vertical direction of the vehicle based on the displacement of the first arm in the vertical direction of the vehicle and the displacement of the second arm in the vertical direction of the vehicle.

Note that the first arm may be directly or indirectly connected to the first front wheel. The second arm may be directly or indirectly connected to the second front wheel.

According to a preferred embodiment of the present invention, the saddle riding type vehicle further includes a damper. The damper damps vibrations in opposite phases in the pair of front wheels. The lock locks the linkage by preventing operation of the damper and unlocks the linkage by allowing the damper to operate.

Accordingly, an additional lock is not necessary. Therefore, a compact saddle riding type vehicle is achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Now, saddle riding type vehicles according to preferred embodiments of the present invention will be described in conjunction with the accompanying drawings in which the same or corresponding portions are designated by the same reference characters and their description will not be repeated. Note that the saddle riding type vehicle may be a scooter type vehicle, for example.

Figure 1:
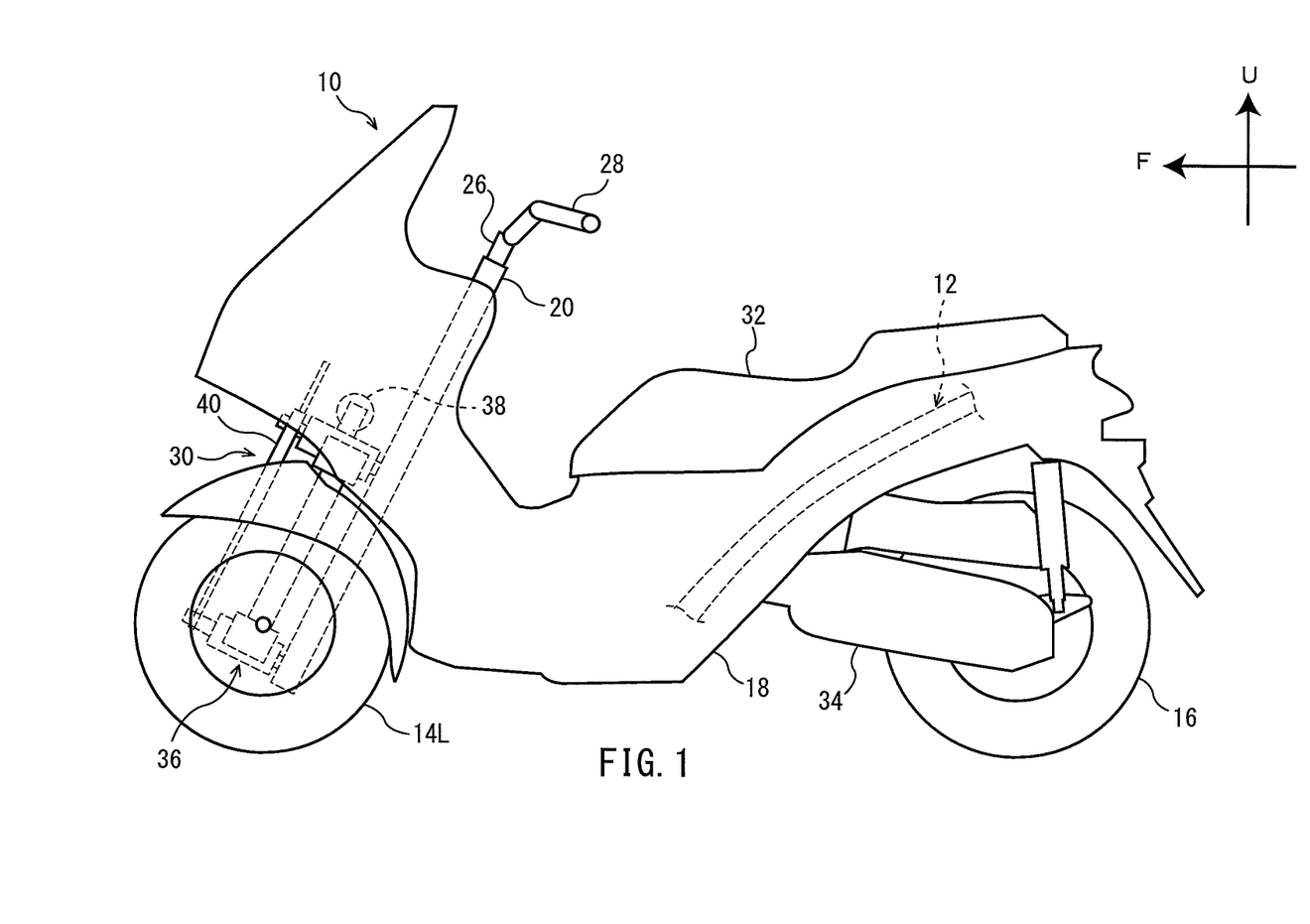
FIG. 1 is a left side view of a general structure of a saddle riding type vehicle according to a preferred embodiment of the present invention.
Figure 2:
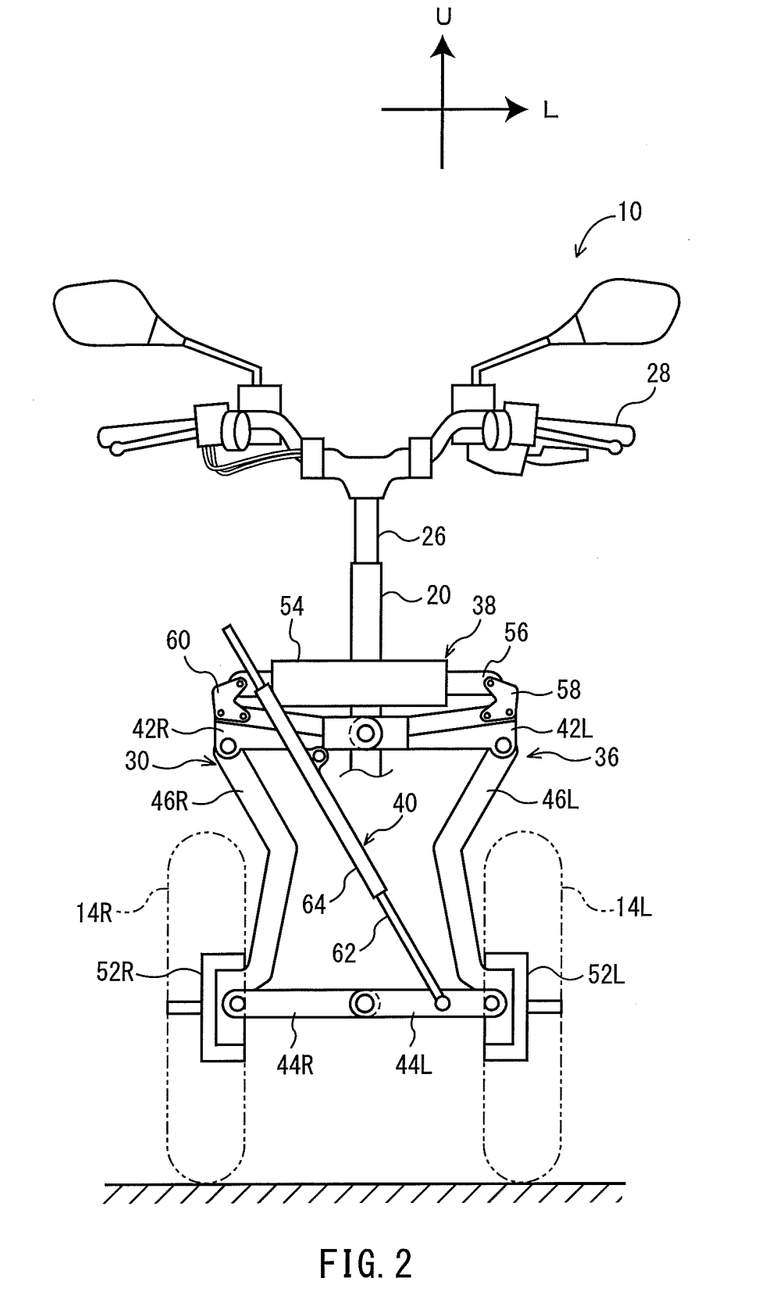
FIG. 2 is a front view of a general structure of a linkage.

FIG. 1 is a left side view of a general structure of a saddle riding type vehicle 10 according to a preferred embodiment of the present invention. FIG. 2 is a front view of a general structure of a linkage provided in the saddle riding type vehicle 10. In the following description, the front, back, left, and right refer to positions as seen by the rider seated on a seat 32 of the saddle riding type vehicle 10. In FIG. 1, the arrow F indicates a forward direction of the saddle riding type vehicle 10 and the arrow U indicates an upward direction of the saddle riding type vehicle 10. In FIG. 2, the arrow L indicates a leftward direction of the saddle riding type vehicle 10 and the arrow U indicates the upward direction of the saddle riding type vehicle 10.

As shown in FIGS. 1 and 2, the saddle riding type vehicle 10 includes a vehicle body frame 12, a pair of front wheels 14L and 14R, and a rear wheel 16.

As shown in FIG. 1, the vehicle body frame 12 is covered with a vehicle cover 18. As shown in FIG. 1, the vehicle body frame 12 includes a head pipe 20.

As shown in FIG. 1, the head pipe 20 is provided at a front portion of the vehicle body frame 12. As shown in FIGS. 1 and 2, the head pipe 20 includes a steering shaft 26 inserted therethrough. As shown in FIGS. 1 and 2, the steering shaft 26 includes a handle 28 at its upper end.

As shown in FIG. 1, a front wheel support 30 is provided in front of the head pipe 20. As shown in FIG. 2, the front wheel support 30 supports the pair of front wheels 14L and 14R. The front wheel support 30 will be described in detail below.

As shown in FIG. 1, the rear wheel 16 is provided below the seat 32. The seat 32 is provided above the vehicle body frame 12. The driving force of an engine 94 (see FIG. 5) is transmitted to rotate the rear wheel 16.

Referring to FIG. 2, the front wheel support 30 will be described. The front wheel support 30 includes a linkage 36, a suspension 38, and a damper 40.

The linkage 36 connects the pair of front wheels 14L and 14R to the vehicle body frame 12 (for example, to a front frame provided in front of the head pipe 20). The linkage 36 includes an upper left arm 42L, an upper right arm 42R, a lower left arm 44L, a lower right arm 44R, a left knuckle arm 46L, and a right knuckle arm 46R.

One of the upper left arm 42L and the upper right arm 42R is able to swing relative to the other around an axial line through a swing center that extends in the front-back direction of the vehicle. The lower left arm 44L is provided under the upper left arm 42L. The lower right arm 44R is provided under the upper right arm 42R. One of the lower left arm 44L and the lower right arm 44R is able to swing relative to the other around an axial line through a swing center that extends in the front-back direction of the vehicle.

The left knuckle arm 46L extends in the vertical direction of the vehicle to connect a left end of the upper left arm 42L and a left end of the lower left arm 44L. The left knuckle arm 46L is able to swing relative to the upper left arm 42L and the lower left arm 44L around an axial line through a swing center that extends in the front-back direction of the vehicle. More specifically, the left knuckle arm 46L is able to move in the vertical direction.

The right knuckle arm 46R extends in the vertical direction of the vehicle to connect a right end of the upper right arm 42R and a right end of the lower right arm 44R. The right knuckle arm 46R is able to swing relative to the upper right arm 42R and the lower right arm 44R around an axial line through a swing center that extends in the front-back direction of the vehicle. More specifically, the right knuckle arm 46R is able to move in the vertical direction.

At a lower end of the left knuckle arm 46L, a front wheel support member 52L is able to swing around an axial line through a swing center that extends in the vertical direction of the vehicle. The front wheel support member 52L supports the front wheel 14L in a rotatable manner.

At a lower end of the right knuckle arm 46R, a front wheel support member 52R is able to swing around an axial line through a swing center that extends in the vertical direction of the vehicle. The front wheel support member 52R supports the front wheel 14R in a rotatable manner.

The front wheel support members 52L and 52R rotate in a plan view as the handle 28 is operated. In this way, the saddle riding type vehicle 10 is able to turn to the left and right.

Figure 4:
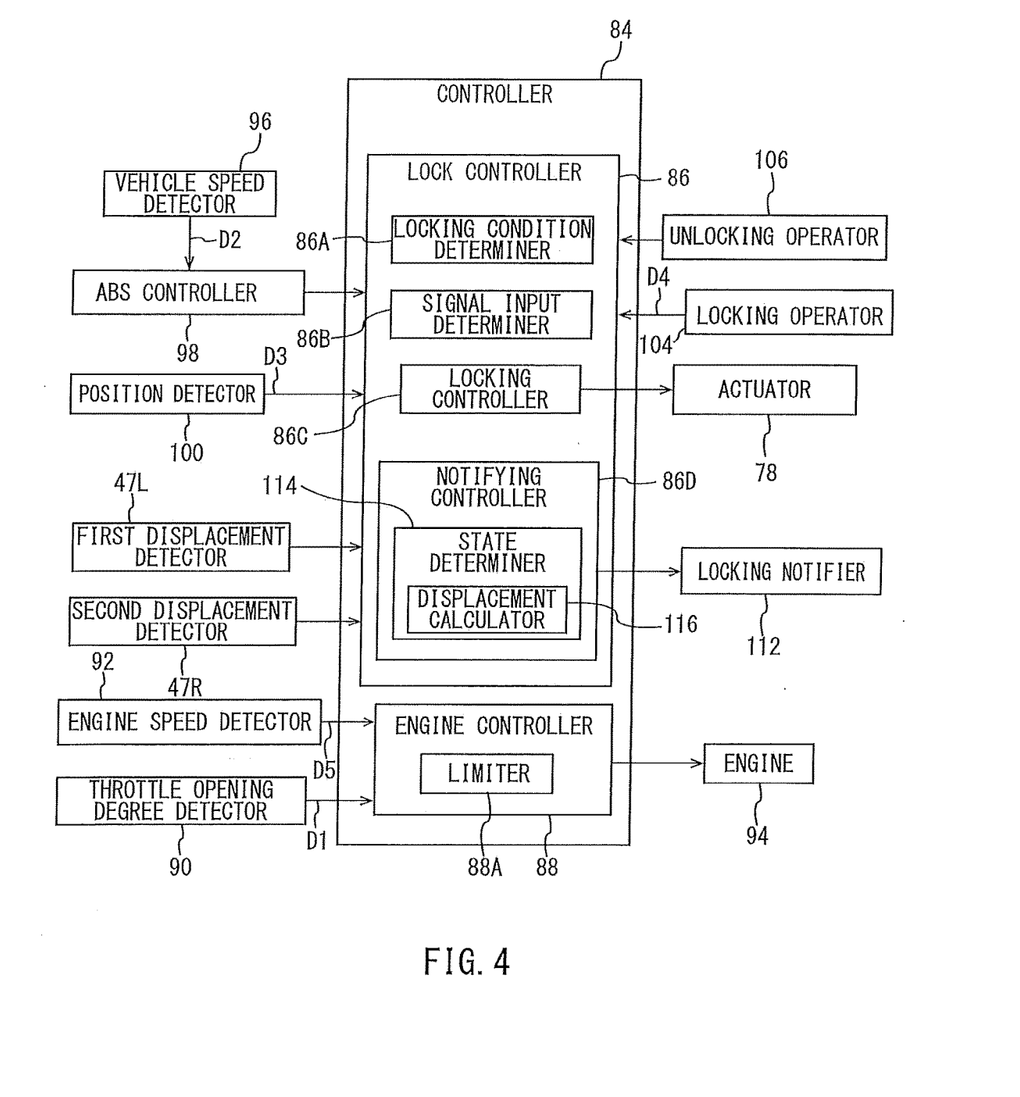
FIG. 4 is a block diagram for illustrating signals input/output to/from a controller.

The linkage 36 includes a first displacement detector 47L (see FIG. 4) and a second displacement detector 47R (see FIG. 4).

The first displacement detector 47L detects a swing angle of the lower left arm 44L. The first displacement detector 47L may detect, for example, a swing angle of the lower left arm 44L itself or that of a member connected to the lower left arm 44L to swing together with the lower left arm 44L. The first displacement detector 47L outputs a signal about the detected swing angle of the lower left arm 44L to a lock controller 86 (see FIG. 4).

Here, the lower left arm 44L is connected to the left knuckle arm 46L, which supports the front wheel support member 52L that supports the front wheel 14L. In other words, the vertical displacement of the front wheel 14L is calculated using the swing angle of the lower left arm 44L.

The second displacement detector 47R detects a swing angle of the upper right arm 42R. The second displacement detector 47R may, for example, detect the swing angle of the upper right arm 42R itself or that of a member connected to the upper right arm 42R to swing together with the upper right arm 42R. The second displacement detector 47R outputs a signal of the detected swing angle of the upper right arm 42R to the lock controller 86 (see FIG. 4).

Here, the upper right arm 42R is connected to the right knuckle arm 46R, which supports the front wheel support member 52R that supports the front wheel 14R. In other words, the vertical displacement of the front wheel 14R is calculated using the swing angle of the upper right arm 42R.

As shown in FIG. 2, the suspension 38 is connected to the linkage 36. The suspension 38 includes a cylinder 54 and a piston 56.

The cylinder 54 is attached to a right end of the upper right arm 42R through a bracket 60. Here, the bracket 60 is fixed to the upper right arm 42R. The cylinder 54 is able to swing relative to the bracket 60. Therefore, the cylinder 54 is able to swing relative to the upper right arm 42R. The cylinder 54 stores operating oil.

The piston 56 is attached to a left end of the upper left arm 42L through a bracket 58. Here, the bracket 58 is fixed to the upper left arm 42L. The piston 56 is able to swing relative to the bracket 58. Therefore, the piston 56 is able to swing relative to the upper left arm 42L.

The piston 56 is able to move in an axial direction of the cylinder 54. The piston 56 includes a main body (not shown) provided inside the cylinder 54. Upon receiving a vibration input that may change the relative position between the upper left arm 42L and the upper right arm 42R, the piston 56 advances/withdraws within the cylinder 54 to move in the axial direction of the cylinder 54. At that time, the movement of the main body of the piston 56 in the cylinder 54 produces a damping force. As a result, displacement vibrations in the linkage 36 are damped. For example, vibrations in the same phase in the upper left arm 42L and the upper right arm 42R, in other words, vibrations in the same phase in the pair of front wheels 14L and 14R are damped by the suspension 38.

As shown in FIG. 2, the damper 40 is attached to the linkage 36. The damper 40 includes a piston 62 and a cylinder 64. The piston 62 is attached to the lower left arm 44L in a swingable manner. The cylinder 64 is attached to the upper right arm 42R in a swingable manner.

Figure 3:
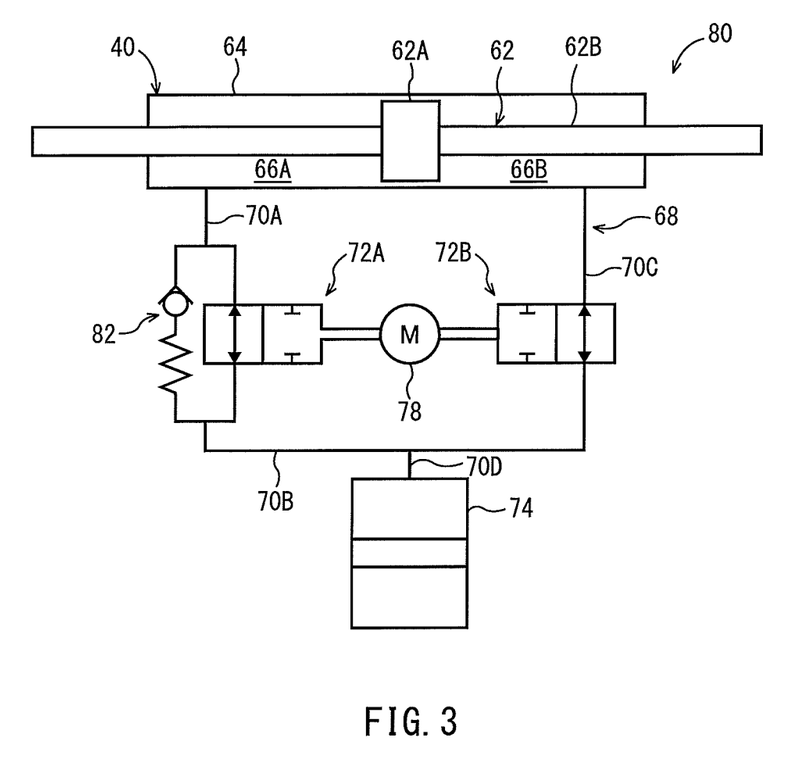
FIG. 3 is a diagram of a hydraulic circuit for a damper.

Referring to FIG. 3, a hydraulic circuit that controls the operation of the damper 40 will be described. FIG. 3 is a diagram of the hydraulic circuit for the damper 40.

The piston 62 includes a piston main body 62A and a piston rod 62B. The piston main body 62A is located in a center portion in an axial direction of the piston rod 62B. The piston main body 62A is able to move in the cylinder 64. The piston rod 62B extends through the cylinder 64 in the axial direction. More specifically, the damper 40 is preferably a so-called through-rod damper, for example.

The cylinder 64 stores operating oil. The inside of the cylinder 64 is partitioned into two spaces (a first space 66A and a second space 66B) by the piston main body 62A. The first and second spaces 66A and 66B are connected to each other by a damping circuit 68. The operating oil is therefore able to move between the first and second spaces 66A and 66B through the damping circuit 68.

The damping circuit 68 includes four flow paths 70A, 70B, 70C, and 70D, two flow regulators 72A and 72B, and one temperature compensating chamber 74. The flow regulator 72A is connected to the first space 66A through the flow path 70A. The flow regulator 72A is connected to the flow regulator 72B through the flow path 70B. The flow regulator 72B is connected to the second space 66B through the flow path 70C. The temperature compensating chamber 74 is connected to the flow path 70B through the flow path 70D.

The flow regulators 72A and 72B each include a valve element and a spring. The valve elements are positioned to block the flow paths in the flow regulators 72A and 72B by the energizing force of the springs. This prevents the operating oil from flowing in the damping circuit 66. In other words, the operation of the damper 40 is prevented. The prevention of the operation of the damper 40 prevents the operation of the linkage 36. More specifically, the linkage 36 attains a locked state.

The actuator 78 is, for example, a motor. The actuator 78 moves the valve element against the energizing force of the spring. At that time, the valves are in such a position that they do not block the flow paths in the flow regulators 72A and 72B. Therefore, the operating oil is allowed to flow in the damping circuit 66. In other words, the damper 40 is allowed to operate. When the operation of the damper 40 is thus allowed, vibrations are damped. When, for example, vibrations in opposite phases are generated in the lower left arm 44L and the upper right arm 42R, or when vibrations in opposite phases are generated in the pair of front wheels 14L and 14R, the vibrations are damped by the damper 40. When the operation of the damper 40 is allowed, the operation of the linkage 36 is allowed. In other words, the linkage attains an unlocked state.

As can be clearly understood from the above description, the damper 40, the damping circuit 66, and the actuator 78 define the lock 80.

Note that in the example shown in FIG. 3, a relief valve 82 is arranged in parallel to the flow regulator 72A. The relief valve 82 prevents the internal pressure of the cylinder 64 from increasing when the operation of the damper 40 is prevented.

Referring to FIG. 4, a controller 84 provided in the saddle riding type vehicle 10 will be described. FIG. 4 is a block diagram for illustrating signals input/output to/from the controller 84.

The controller 84 is configured or programmed to include a lock controller 86 and an engine controller 88.

The lock controller 86 controls locking and unlocking of the linkage 36 by the lock 80. The lock controller 86 is configured or programmed to include a locking condition determiner 86A, a signal input determiner 86B, and a locking controller 86C.

The locking condition determiner 86A determines whether a prescribed locking condition is fulfilled based on a throttle opening degree signal D1, a vehicle speed signal D2, and a position signal D3. Non-limiting examples of locking conditions will be described below.

The throttle opening degree signal D1 is output by a throttle opening degree detector 90 and represents a throttle opening degree. The throttle opening degree signal D1 is input to the lock controller 86 through the engine controller 88.

The vehicle speed signal D2 is output by a vehicle speed detector 96 and represents a vehicle speed. The vehicle speed detector 96 includes, for example, a wheel speed sensor. According to a preferred embodiment of the present invention, the saddle riding type vehicle 10 includes an ABS (anti-lock braking system). Therefore, the vehicle speed signal D2 is input to the lock controller 86 through an ABS controller 98 that controls the operation of the ABS.

The position signal D3 is output by a position detector 100 and represents the position of the valve elements provided in the flow regulators 72A and 72B. The position detector 100 determines whether the linkage 36 is locked. The position detector 100 outputs a locked position signal as the position signal D3 when the valve elements are positioned to block the flow paths in the flow regulators 72A and 72B. The position detector 100 outputs an unlocked position signal as the position signal D3 when the valve elements are not in positions to block the flow paths in the flow regulators 72A and 72B. The position signal D3 is input to the lock controller 86. The position detector 100 detects the positions of the valve elements included in the flow regulators 72A and 72B, for example, by directly detecting the positions of these valve elements or by detecting the position of the actuator 78 as well as a voltage that drives the actuator 78.

The signal input determiner 86B determines whether an operation signal is input when the locking condition is fulfilled. A result of a determination by the locking condition determiner 86A and an operation signal input to the lock controller 86 are used to make the determination.

The operation signal D4 is output by a locking operator 104. The locking operator 104 outputs the operation signal D4 to the lock controller 86 when the rider carries out an operation. The locking operator 104 is positioned so that the rider is able to operate the operator while driving. The locking operator 104 includes, for example, an operation switch provided on the handle 28.

The locking controller 86C controls the lock 80 to lock the linkage 36 if the operation signal D4 is input when the locking condition is fulfilled. More specifically, the locking controller 86C drives the actuator 78 to move the valve elements included in the selector valves 76. In this way, the valves block the flow paths in the selector valves 76. As a result, the linkage 36 attains a locked state. Note that a result of a determination from the signal input determiner 86B is used to determine whether the operation signal D4 is input when the locking condition is fulfilled.

The locking controller 86C unlocks the linkage 36 if a prescribed unlocking condition is fulfilled. The unlocking condition may be, for example, a rider's operation of an unlocking operator 106 provided in the saddle riding type vehicle 10, a vehicle speed higher than a prescribed vehicle speed, or an engine speed of the engine 94 becoming higher than a prescribed engine speed. When the rider operates the unlocking operator 106, the unlocking operator 106 outputs the operation signal D4 to the lock controller 86. The unlocking operator 106 is located as to be able to be operated by the rider. The unlocking operator 106 may include, for example, an operation switch provided on the handle 28.

The saddle riding type vehicle 10 further includes a locking notifier 112. The locking notifier 112 notifies the rider of a locked state of the linkage 36 and when a relative displacement between the pair of front wheels 14L and 14R in the vertical direction exceeds a prescribed range. More specifically, the locking notifier 112 notifies the rider that the linkage 36 is locked and relative displacement between the pair of front wheels 14L and 14R in the vertical direction exceeds an upper limit in a predetermined tolerated range (hereinafter, the prescribed upper limit). For example, if the linkage 36 is locked and the tilt angle of the vehicle exceeds, for example, about 3°, the locking notifier 112 notifies the rider of this state.

The notification provided by the locking notifier 112 may be anything that is visibly or audibly recognizable by the rider. The notification that is visibly recognizable by the rider may be made using a visual indicator. The visual indicator may be, for example, included in a meter positioned near the handle 28. The notification that is audibly recognizable by the rider may include a speaker. The speaker is, for example, provided in the meter positioned near the handle 28.

The lock controller 86 is further configured or programmed to include a notifying controller 86D that controls the operation of the locking notifier 112. The notifying controller 86D controls the locking notifier 112 to notify the locked state of the linkage 36 if the linkage 36 is locked and relative displacement between the pair of front wheels 14L and 14R in the vertical direction exceeds the prescribed upper limit.

The notifying controller 86D is configured or programmed to include a state determiner 114. The state determiner 114 includes a displacement calculator 116.

The displacement calculator 116 calculates displacement of the front wheel 14R relative to the front wheel 14L in the vertical direction of the vehicle based on a swing angle of the lower left arm 44L detected by the first displacement detector 47L and a swing angle of the upper right arm 42R detected by the second displacement detector 47R. The state determiner 114 determines whether the relative displacement between the pair of front wheels 14L and 14R in the vertical direction exceeds the prescribed upper limit based on the calculation result from the displacement calculator 116.

Note that whether the linkage 36 is in a locked state may be determined by referring to the position signal D3 output by the position detector 100.

The engine controller 88 includes a limiter 88A. The limiter 88A limits the engine speed of the engine 94 if the linkage 36 is locked and the relative displacement between the front wheels 14L and 14R in the vertical direction exceeds the prescribed upper limit.

The saddle riding type vehicle 10 further includes an engine speed detector 92. The engine speed detector 92 outputs an engine speed signal D5. The engine speed signal D5 represents the engine speed of the engine 94. The engine speed signal D5 is input to the engine controller 88. The engine speed signal D5 is, for example, used to control the engine speed as will be described below.

Figure 5:
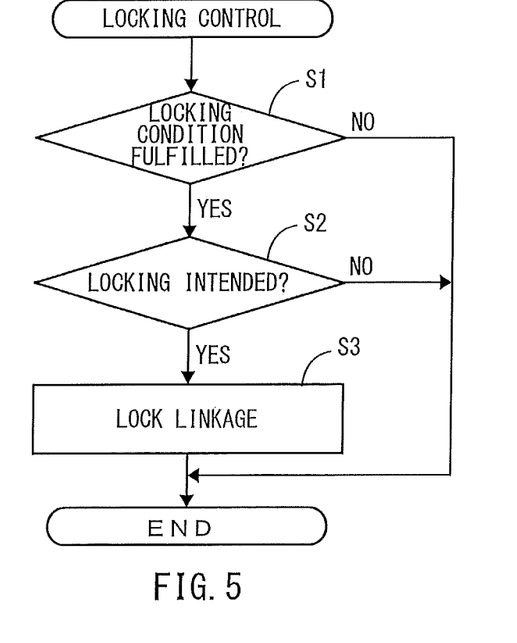
FIG. 5 is a flowchart for illustrating locking control by a lock controller.

Now, control carried out by the lock controller 86 to lock the linkage 36 (locking control by the lock controller 86) will be described. Note that the locking control performed by the lock controller 86 is not limited to the following example.

The lock controller 86 controls the lock 80 to lock the linkage 36 if the operation signal D4 (output by the locking operator 104) is input upon fulfilling a locking condition in which the linkage 36 is able to be locked. For example, the locking condition is fulfilled if all of the following conditions 1 to 3 are satisfied.

Condition 1: The linkage 36 is in an unlocked state.
Condition 2: The present throttle opening degree is zero.
Condition 3: The present vehicle speed is lower than a prescribed vehicle speed.

Now, referring to FIG. 5, the locking control by the lock controller 86 will be described. FIG. 5 is a flowchart for illustrating the locking control by the lock controller 86.

First, the lock controller 86 determines in step S1 whether the locking condition is established. More specifically, the locking condition determiner 86A determines whether all of the above-described conditions 1 to 3 are satisfied.

The locking condition determiner 86A determines whether the linkage 36 is in an unlocked state by referring to an input position signal D3. If the unlocked position signal D3 is input, the condition 1 is satisfied.

The locking condition determiner 86A determines whether the present throttle opening degree is zero by referring to an input throttle opening degree signal D1. If the throttle opening degree is zero, in other words, if the throttle valve is closed, the condition 2 is satisfied.

The locking condition determiner 86A determines whether the present vehicle speed is lower than a prescribed vehicle speed (about 10 km/h, for example) by referring to an input vehicle speed signal D2. If the present vehicle speed is lower than the prescribed vehicle speed, the condition 3 is satisfied.

Unless at least one of the conditions 1 to 3 is satisfied, the lock controller 86 ends the locking control. On the other hand, if all of the conditions 1 to 3 are satisfied, the lock controller 86 determines in step S2 whether the rider intends to lock the linkage 36. More specifically, the signal input determiner 86B determines whether an input condition is fulfilled. For example, an input condition is fulfilled if the following condition 4 is satisfied.

Condition 4: The operation signal D4 is input.

The signal input determiner 86B determines whether the operation signal D4 is input. If the operation signal D4 is input, the condition 4 is satisfied.

The operation signal D4 may be input before or after fulfilling the locking condition.

If the condition 4 is not satisfied, the lock controller 86 ends the locking control. On the other hand, if the condition 4 is satisfied, the lock controller 86 locks the linkage 36 in step S3. More specifically, the locking controller 86C drives the actuator 78 to lock the linkage 36. The lock controller 86 subsequently ends the locking control.

Figure 6:
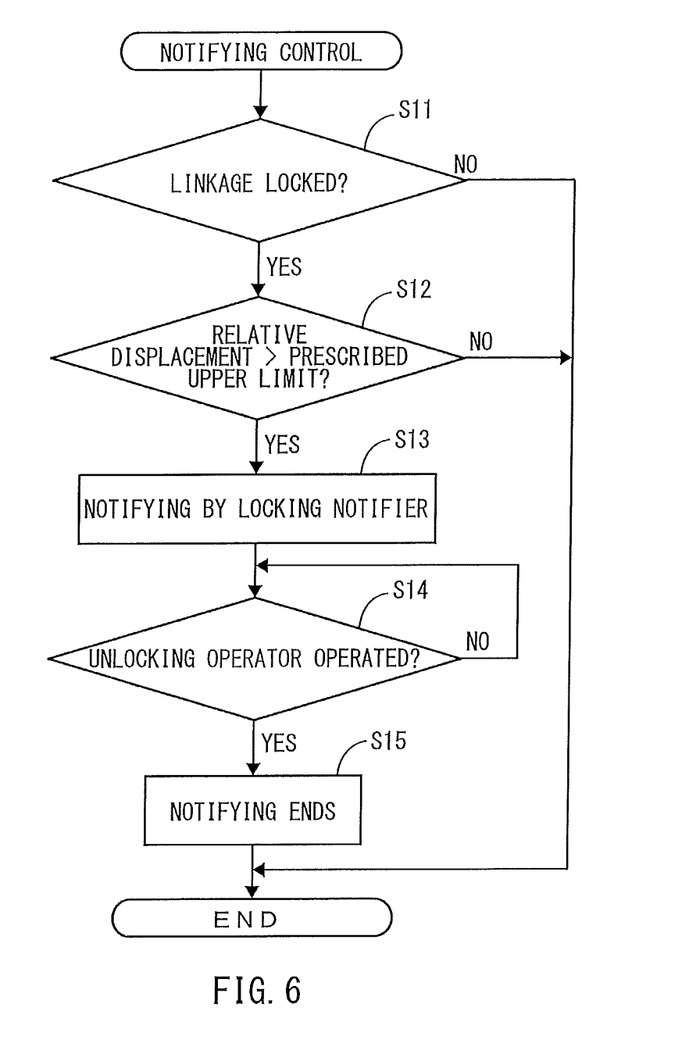
FIG. 6 is a flowchart for illustrating notifying control by a notifying controller.

Now, notifying control by the notifying controller 86D will be described. The notifying controller 86D controls the locking notifier 112 to notify a locked state of the linkage 36 if the linkage 36 is locked and relative displacement between the pair of front wheels 14L and 14R in the vertical direction exceeds a prescribed upper limit.

Now, referring to FIG. 6, the notifying control by the notifying controller 86D will be described. FIG. 6 is a flowchart for illustrating the notifying control by the notifying controller 86D.

First, in step S11, the notifying controller 86D determines whether the linkage 36 is in a locked state. More specifically, the notifying controller 86D refers to an input position signal D3 and determines whether the linkage 36 is locked. If a locked position signal D3 is input, the linkage 36 is locked.

If the linkage 36 is not locked (NO in step S11), the notifying controller 86D ends the notifying control. On the other hand, if the linkage 36 is locked (YES in step S11), the notifying controller 86D (the state determiner 104 to be specific) determines in step S12 whether relative displacement between the front wheels 14L and 14R in the vertical direction exceeds the prescribed upper limit.

If the relative displacement between the front wheels 14L and 14R in the vertical direction does not exceed the prescribed upper limit (NO in step S12), the notifying controller 86D ends the notifying control. On the other hand, if the relative displacement between the front wheels 14L and 14R in the vertical direction exceeds the prescribed upper limit (YES in step S12), the notifying controller 86D carries out notification by the locking notifier 112 in step S13. More specifically, the notifying controller controls the operation of the locking notifier 112 to start to notify the rider of the locked state of the linkage 36.

Subsequently, the notifying controller 86D determines in step S14 whether the unlocking operator 106 has been operated. If a signal from the unlocking operator 106 is input, the unlocking operator 106 has been operated.

If the unlocking operator 106 has not been operated (NO in step S14), the notifying controller 86D stands by until the unlocking operator 106 is operated. At that time, the locking notifier 112 continues to notify the locked state of the linkage 36. On the other hand, if the unlocking operator 106 has been operated (YES in step S14), the notifying controller 86D ends the notification by the locking notifier 112 in step S15. The notifying controller 86D subsequently ends the notifying control.

Figure 7:
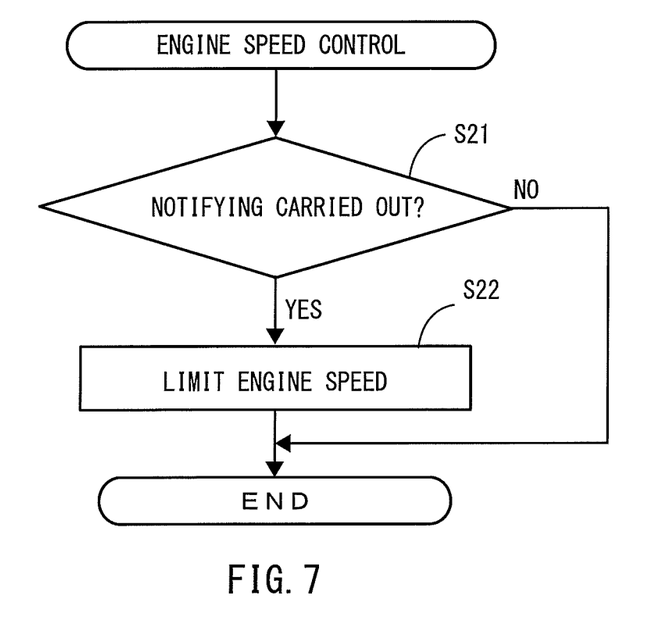
FIG. 7 is a flowchart for illustrating engine speed control by an engine controller.

Now, referring to FIG. 7, engine speed control by the engine controller 88 will be described. FIG. 7 is a flowchart for illustrating the engine speed control by the engine controller 88.

First, the engine controller 88 determines in step S21 whether the linkage 36 is locked and relative displacement between the pair of front wheels 14L and 14R in the vertical direction exceeds a prescribed upper limit, in other words whether notification by the locking notifier 112 has been carried out. The determination is carried out, for example, by referring to a signal from the notifying controller 86D (a signal indicates that notification by the locking notifier 112 has been carried out).

If notification by the locking notifier 112 has not been carried out (NO in step S21), the engine controller 88 ends the engine speed control. On the other hand, if the notification by the locking notifier 112 has been carried out (YES in step S21), the engine controller 88 limits the engine speed in step S22. More specifically, the limiter 88A operates so that the engine speed of the engine 94 does not exceed a prescribed upper limit if the rider opens the throttle. The engine speed of the engine 94 is obtained by, for example, referring to an output from the engine speed detector 92 provided in the saddle riding type vehicle 10 (see FIG. 4). Subsequently, the engine controller 88 ends the engine speed control.

Note that the limiting by the engine controller 88 (the limiter 88A to be specific) ends if, for example, the notification by the locking notifier 112 ends.

In the saddle riding type vehicle 10, the linkage 36 is able to be locked. When the linkage 36 is locked, the vehicle is often in its upright state. Here, the "upright state" refers to a state in which the side surfaces of the front wheels 14L and 14R are parallel or substantially parallel to the direction of gravity (the vertical direction), in other words, the state in which the axle for the front wheels 14L and 14R is orthogonal or substantially orthogonal to the direction of gravity. When the vehicle is upright, the rider may sometimes feel as if the front wheels 14L and 14R are locked when they are in the same position in the direction of gravity. However, the front wheels 14L and 14R may be locked when they are relatively displaced in the direction of gravity because of a sloped road surface or steps. In this case, if the vehicle is moved to a location on a flat road surface, the vehicle may be tilted.

In the saddle riding type vehicle 10, the locked state of the linkage 36 is notified to the rider when the front wheels 14L and 14R are shifted in the vertical direction. Therefore, an actual state of the vehicle and a state of the vehicle understood by the rider are the same or substantially the same.

In the saddle riding type vehicle 10, the locked state of the linkage 36 continues to be notified to the rider. Therefore, it is easier to make the rider aware of the locked state of the linkage 36.

In the saddle riding type vehicle 10, the locked state of the linkage 36 is notified to the rider until the linkage 36 is unlocked. Therefore, it is easier to let the rider be aware of the state in which the linkage 36 is locked when the front wheels 14L and 14R are relatively displaced in the direction of gravity.

In the saddle riding type vehicle 10, when the linkage 36 is locked and the front wheels 14L and 14R are relatively displaced in the direction of gravity, the traveling of the vehicle is limited by the limiter 88A. Therefore, the vehicle is prevented from traveling when the front wheels 14L and 14R are relatively displaced in the direction of gravity.

According to the above-described preferred embodiments, the engine controller 88 includes the limiter 88A, but the engine controller 88 does not have to include the limiter 88A.

According to the above-described preferred embodiments, the first displacement detector 47L detects a swing angle of the lower left arm 44L, and the second displacement detector 47R detects a swing angle of the upper right arm 42R. However, the first displacement detector may detect a swing angle of the lower left arm 44L and the second displacement detector may detect a swing angle of the lower right arm 44R or the first displacement detector may detect a swing angle of the upper left arm 42L and the second displacement detector may detect a swing angle of the upper right arm 42R.

According to the above-described preferred embodiments, the locked state of the linkage 36 continues to be notified to the rider, but the notification does not have to continue.

According to the above-described preferred embodiments, it is determined whether notification by the locking notifier 112 is carried out and if the notification by the locking notifier 112 is carried out, the engine speed of the engine 94 does not exceed a prescribed upper limit. If the notification by the locking notifier 112 does not continue to be carried out, it may be determined whether the linkage 36 is locked and whether relative displacement between the front wheels 14L and 14R in the vertical direction exceeds a prescribed upper limit, and if the linkage 36 is locked and the relative displacement between the front wheels 14L and 14R in the vertical direction exceeds the prescribed upper limit, the engine speed of the engine 94 is kept less than the prescribed upper limit.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A saddle riding type vehicle comprising:
a vehicle body frame;
a pair of front wheels;
a linkage that connects the pair of front wheels to the vehicle body frame;
a lock that locks the linkage by preventing operation of the linkage and unlocks the linkage by allowing the linkage to operate;
a controller that controls locking and unlocking of the linkage by the lock;
a state determiner that determines whether relative displacement between the pair of front wheels in a vertical direction of the vehicle exceeds a prescribed range; and
a notifier that notifies a rider that the linkage is locked when the relative displacement between the pair of front wheels in the vertical direction of the vehicle exceeds the prescribed range; wherein
the controller controls the notifier to notify the rider that the linkage is in a locked state when the linkage is locked and the relative displacement between the pair of front wheels in the vertical direction of the vehicle exceeds an upper limit of the prescribed range.

2. The saddle riding type vehicle according to claim 1, further comprising a damper that damps vibrations in opposite phases in the pair of front wheels, wherein the lock locks the linkage by preventing operation of the damper and unlocks the linkage by allowing the damper to operate.

3. The saddle riding type vehicle according to claim 1, wherein the notifier continuously notifies a locked state of the linkage.

4. The saddle riding type vehicle according to claim 3, further comprising an operator that outputs an operation signal to the controller in response to an operation input by the rider; wherein
the controller controls the lock to unlock the linkage if the operation signal is input; and
the notifier notifies the rider that the linkage is locked until the linkage is unlocked if the relative displacement between the pair of front wheels in the vertical direction of the vehicle exceeds the prescribed range while the lock locks the linkage.

5. The saddle riding type vehicle according to claim 3, further comprising:
an engine; and
an engine controller that controls the engine; wherein
the engine controller includes a limiter that limits an engine speed of the engine if the lock has locked the linkage and the relative displacement between the pair of front wheels in the vertical direction of the vehicle exceeds the prescribed range.

6. The saddle riding type vehicle according to claim 3, wherein the pair of front wheels includes a first front wheel and a second front wheel spaced apart from the first front wheel in a vehicle-widthwise direction;
the saddle riding type vehicle further comprises a displacement calculator that calculates displacement of the second front wheel relative to the first front wheel in the vertical direction of the vehicle; and
the state determiner determines whether the relative displacement between the pair of front wheels in the vertical direction of the vehicle exceeds the prescribed range based on a calculation result from the displacement calculator.

7. The saddle riding type vehicle according to claim 6, further comprising:
a first arm connected to the first front wheel in a vertically displaceable manner;
a second arm connected to the second front wheel in a vertically displaceable manner;
a first displacement detector that detects displacement of the first arm in the vertical direction of the vehicle; and
a second displacement detector that detects displacement of the second arm in the vertical direction of the vehicle; wherein
the displacement calculator calculates displacement of the second front wheel relative to the first front wheel in the vertical direction of the vehicle based on the displacement of the first arm in the vertical direction of the vehicle and the displacement of the second arm in the vertical direction of the vehicle.

* * * * *